(12) United States Patent
Yamamoto et al.

(10) Patent No.: US 11,951,846 B2
(45) Date of Patent: Apr. 9, 2024

(54) STRUCTURE OF DISCONNECT PLUG FOR ELECTRIC VEHICLE

(71) Applicants: Nissan Motor Co., Ltd., Kanagawa (JP); RENAULT S.A.S., Boulogne-Billancourt (FR)

(72) Inventors: Yoichi Yamamoto, Kanagawa (JP); Toshitsugu Hirose, Kanagawa (JP); Hiroaki Nabuchi, Kanagawa (JP); Kentaro Hatta, Kanagawa (JP); Koichi Hayashi, Kanagawa (JP); Miki Ito, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 32 days.

(21) Appl. No.: 17/921,827

(22) PCT Filed: Apr. 28, 2020

(86) PCT No.: PCT/IB2020/000409
§ 371 (c)(1),
(2) Date: Oct. 27, 2022

(87) PCT Pub. No.: WO2021/220028
PCT Pub. Date: Nov. 4, 2021

(65) Prior Publication Data
US 2023/0158898 A1    May 25, 2023

(51) Int. Cl.
*B60L 50/64* (2019.01)
*B60K 1/04* (2019.01)
(Continued)

(52) U.S. Cl.
CPC ............. *B60L 50/64* (2019.02); *B60K 1/04* (2013.01); *B60L 50/66* (2019.02); *B62D 25/20* (2013.01);
(Continued)

(58) Field of Classification Search
CPC .......... B60L 50/64; B60L 50/66; B60K 1/04; B60K 2001/0433; B60Y 2306/01; H01M 2220/20; B62D 25/20; B62D 25/24
See application file for complete search history.

(56) References Cited

U.S. PATENT DOCUMENTS

| 9,564,664 B2 * | 2/2017 | Tanigaki ........... H01M 10/6566 |
| 2015/0136504 A1 | 5/2015 | Tsujimura et al. |
| 2022/0305899 A1 * | 9/2022 | Yokoyama ............... B60K 1/04 |

FOREIGN PATENT DOCUMENTS

| CN | 103534118 A | 1/2014 |
| EP | 2711222 A1 | 3/2014 |

(Continued)

*Primary Examiner* — Faye M Fleming
(74) *Attorney, Agent, or Firm* — Osha Bergman Watanabe & Burton LLP

(57) ABSTRACT

In a structure of a disconnect plug of an electric vehicle, a plug bracket is raised from an inside of a battery unit to an inside of a bulge formed on a floor panel under rear seats for preventing a submarine motion of a passenger. In addition, a disconnect plug is detachably attached to a front face of a plug bracket, and an opening for accessing to the disconnect plug is formed on a front wall of the bulge. Further, a cover for covering the opening capable of being opened and closed is provided on a trim beneath a front face of a seat cushion of the rear seats.

5 Claims, 5 Drawing Sheets

(51) Int. Cl.
*B60L 50/60* (2019.01)
*B62D 25/20* (2006.01)
*B62D 25/24* (2006.01)
*H01M 50/574* (2021.01)

(52) U.S. Cl.
CPC .......... *B62D 25/24* (2013.01); *H01M 50/574* (2021.01); *B60K 2001/0433* (2013.01); *B60Y 2306/01* (2013.01); *H01M 2220/20* (2013.01)

(56) References Cited

FOREIGN PATENT DOCUMENTS

| | | |
|---|---|---|
| JP | 2012-240476 A | 12/2012 |
| JP | 2013-248969 A | 12/2013 |
| JP | 2017-052302 A | 3/2017 |

* cited by examiner

STRUCTURE OF DISCONNECT PLUG FOR ELECTRIC VEHICLE

TECHNICAL FIELD

The present invention relates to a structure of a disconnect plug of an electric vehicle.

BACKGROUND ART

A battery electric vehicle (BEV) or a hybrid electric vehicle (HEV) with high-voltage circuits is equipped with a disconnect plug for safely disconnecting the high voltage circuits. In many cases, the disconnect plug is mounted on a battery unit, and the battery unit, which is large in volume and heavy, is often installed beneath rear seats. A Patent Literature 1 listed below discloses a structure of a disconnect plug. A disconnect plug is called as a service disconnector in the Patent Literature 1, and is also called as a disconnect switch or a high-voltage disconnect.

A disconnect plug is removed for operational safety during maintenance or passenger rescue. In the structure of the disconnect plug disclosed in Patent Literature 1, an opening for accessing the disconnect plug is formed on a floor panel under a seat cushion of rear seats. Therefore, the large seat cushion must be removed when removing the disconnect plug to disconnect the high voltage circuits.

PRIOR-ART LITERATURE

Patent Literature

Patent Literature 1: Japanese Patent Application Publication No. 2013-248969

SUMMARY OF INVENTION

Problem to be Solved by the Invention

Since the disconnect plug disclosed in the Patent Literature 1 is inaccessible without removing the seat cushion of the rear seats, workability of maintenance or passenger rescue becomes poor. In particular, it may be difficult to remove the seat cushion if the vehicle body has been deformed due to an accident or the like. Thus, a structure of a disconnect plug that allows easy access to the disconnect plug is desired.

Therefore, it is an object of the present invention is to provide a structure of a disconnect plug of an electric vehicle that allows easily access to a disconnect plug.

Means for Solving the Problem

In a disconnect plug structure for an electric vehicle according to an aspect of the present invention, a plug bracket is raised from an inside of a battery unit to an inside of a bulge formed on a floor panel under rear seats for preventing a submarine motion of a passenger. In addition, a disconnect plug is detachably attached to a front face of the plug bracket, and an opening for accessing the disconnect plug is formed on a front wall of the bulge. Furthermore, a cover is provided on a trim beneath a front face of a seat cushion of the rear seats to be capable of being opened and closed for covering the opening. Note that the term "rear seats" here refers to the seats behind the front-most seats, which are a driver's seat and a front passenger seat. For example, in a case where there are three rows of seats, those in the second and third rows are the rear seats.

Effect of the Invention

According to the aspect, the disconnect plug allows easy access to the disconnect plug from a trim beneath the front end of the seat cushion of the rear seats without the need to remove the seat cushion.

DESCRIPTION OF EMBODIMENTS

Figure 1:
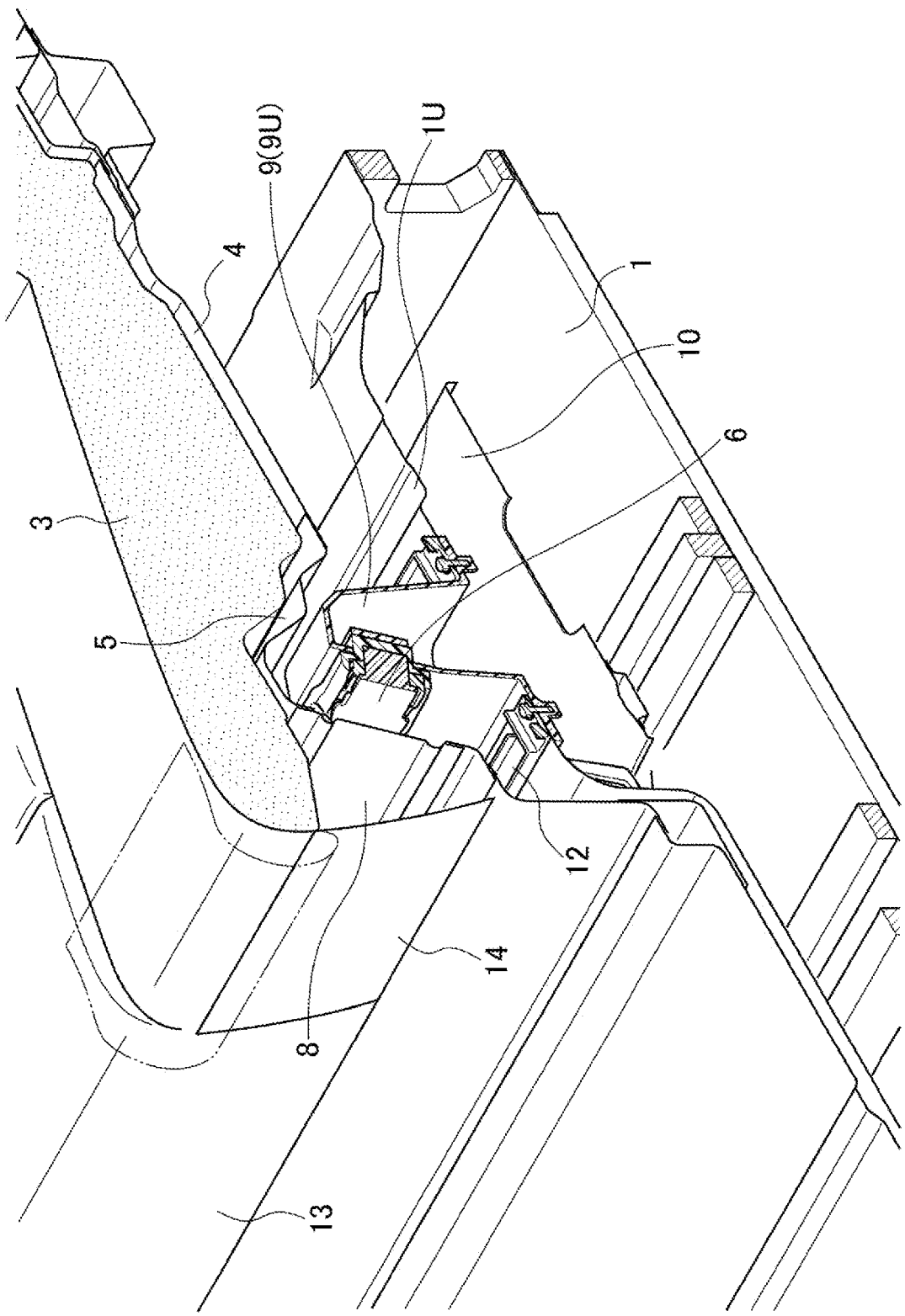
FIG. 1 is a cross-sectional perspective view of a structure of a disconnect plug according to an embodiment.
Figure 2:
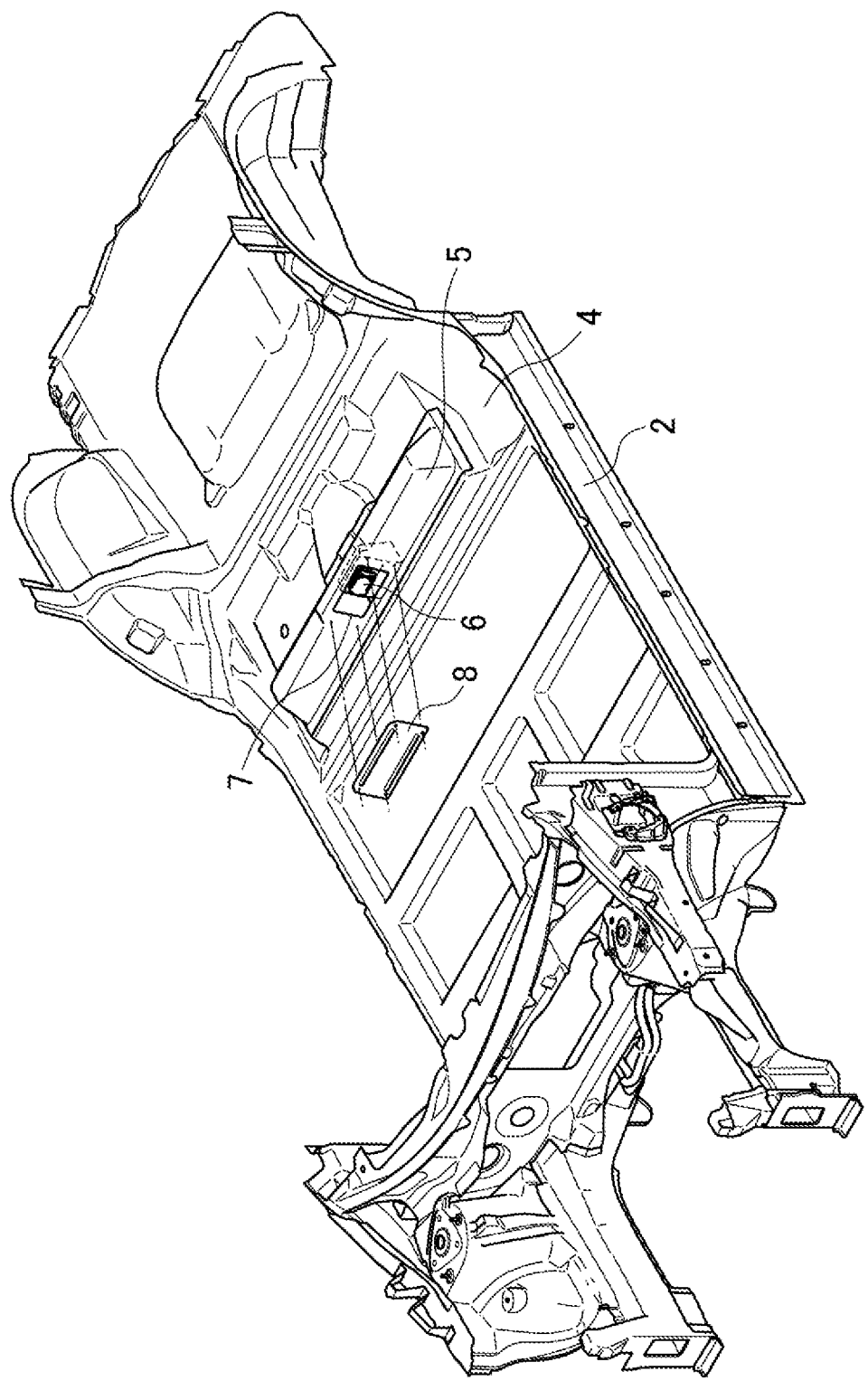
FIG. 2 is a perspective view of a floor panel in the structure of the disconnect plug.
Figure 3:
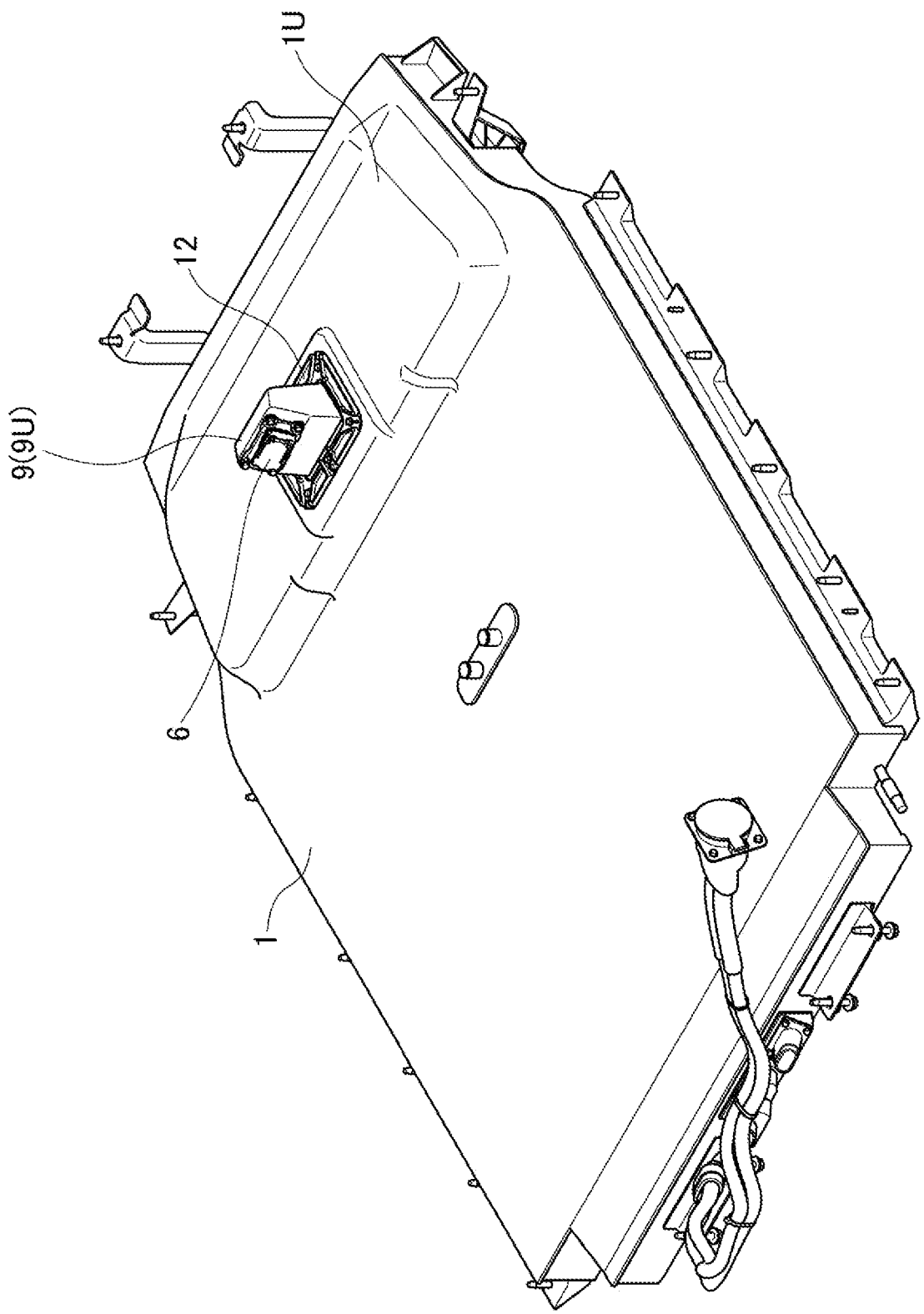
FIG. 3 is a perspective view of a battery unit in the structure of the disconnect plug.

Hereinafter, a structure of a disconnect plug of an electric vehicle according to an embodiment will be explained with reference to FIG. 1 to FIG. 4.

An electric vehicle in the present embodiment does not have an internal combustion engine, but is a battery electric vehicle (BEV) that drives its four road wheels, which are driven by two motors (not shown in the drawings) mounted in its front section and its rear sections, respectively, by consuming electric power stored in a battery unit 1. When this vehicle decelerates, the motors generate regenerative electric power and the battery unit 1 is charged by the generated electric power. The battery unit 1 is also charged by electric power supplied from outside the vehicle.

A cruising range with no charging of a BEV is determined by electric power stored in its battery unit (and regenerated electric power). Therefore, it is necessary to install a battery unit with more charging capacity in order to meet the need for a longer cruising range with no charging. The larger charging capacity is made, the larger a volume of the battery unit becomes. Therefore, a battery unit of a BEV is often installed in a space beneath rear seats. In a case of a BEV having no internal combustion engine, spaces for exhaust pipes and fuel tanks can be also utilized, so it is easy to secure a large space beneath rear seats.

The battery unit 1 in the present embodiment occupies not only a space beneath rear seats, but also an entire of an under-floor area of a passenger compartment. That is, the battery unit 1 is installed between front road wheels and rear road wheels (front wheel houses and rear wheel houses) and between a pair of side sills 2. Since weight per unit volume of the battery unit 1 is large, such an installation position of the battery unit 1 lowers the center of gravity of the vehicle and thereby improves vehicle dynamics.

A battery unit is a high voltage device that can output high voltage electric power. For this reason, its high voltage system is equipped with a disconnect plug that safely disconnects high voltage circuits (electric power circuits). In many cases, a disconnect plug is mounted on a battery unit that is an electric power source. Also in the present embodiment, a disconnect plug 6 is mounted on the battery unit. The disconnect plug 6 will be described in detail later.

On the other hand, in order to prevent a so-called "submarining motion" of passengers sitting in rear seats upon a frontal collision, an anti-submarining protrusion(s) protrudes upward from a floor panel made of metal under a seat cushion(s) of the rear seats. This protrusion may be configured of a member extending in a lateral direction (an anti-submarining bar) or a bulge formed on the floor panel under the seat cushion. In the present embodiment, it is formed as a bulge 5 protruding upward from a floor panel 4 under a seat cushion 3.

The seat cushion 3 is placed on the bulge 5, and the bulge 5 is located within a front portion of the seat cushion 3. The bulge 5 prevents the submarine motion, in which passenger's buttocks move forward due to an inertia force upon a frontal collision. A ramp of a rear wall of the bulge 5 restricts the forward movement of the passenger's buttocks via the seat cushion 3. Restraint by a seat belt is brought effectively by the restraint of the submarine motion.

In the present embodiment, a driver seat and a front passenger seat, which are front seats, are separated seats, but the rear seats are provided as a bench seat in which three passengers can sit. The bulge 5 extends in a lateral direction corresponding to a width of this bench seat. In other words, the bulge 5 has the width that covers all seating positions of the three passengers. An opening 7 for accessing to the disconnect plug 6 is formed in the center of the front wall of the bulge 5 in the lateral direction. A lid 8 made of metal for closing the opening 7 is attached, by screws, to the opening 7 that is opened to front.

The battery unit 1 includes a plug bracket 9 that is raised from its inside to the inside of the bulge 5. The disconnect plug 6 is detachably attached to a front face of an upper portion of this plug bracket 9. When the disconnect plug 6 is manually removed, the high voltage circuits (the electric power circuits) of the battery unit 1 are mechanically disconnected. The disconnect plug 6 may be removed by a mechanic during maintenance of the high voltage device or during passenger rescue in the event of a vehicle accident.

Figure 4:
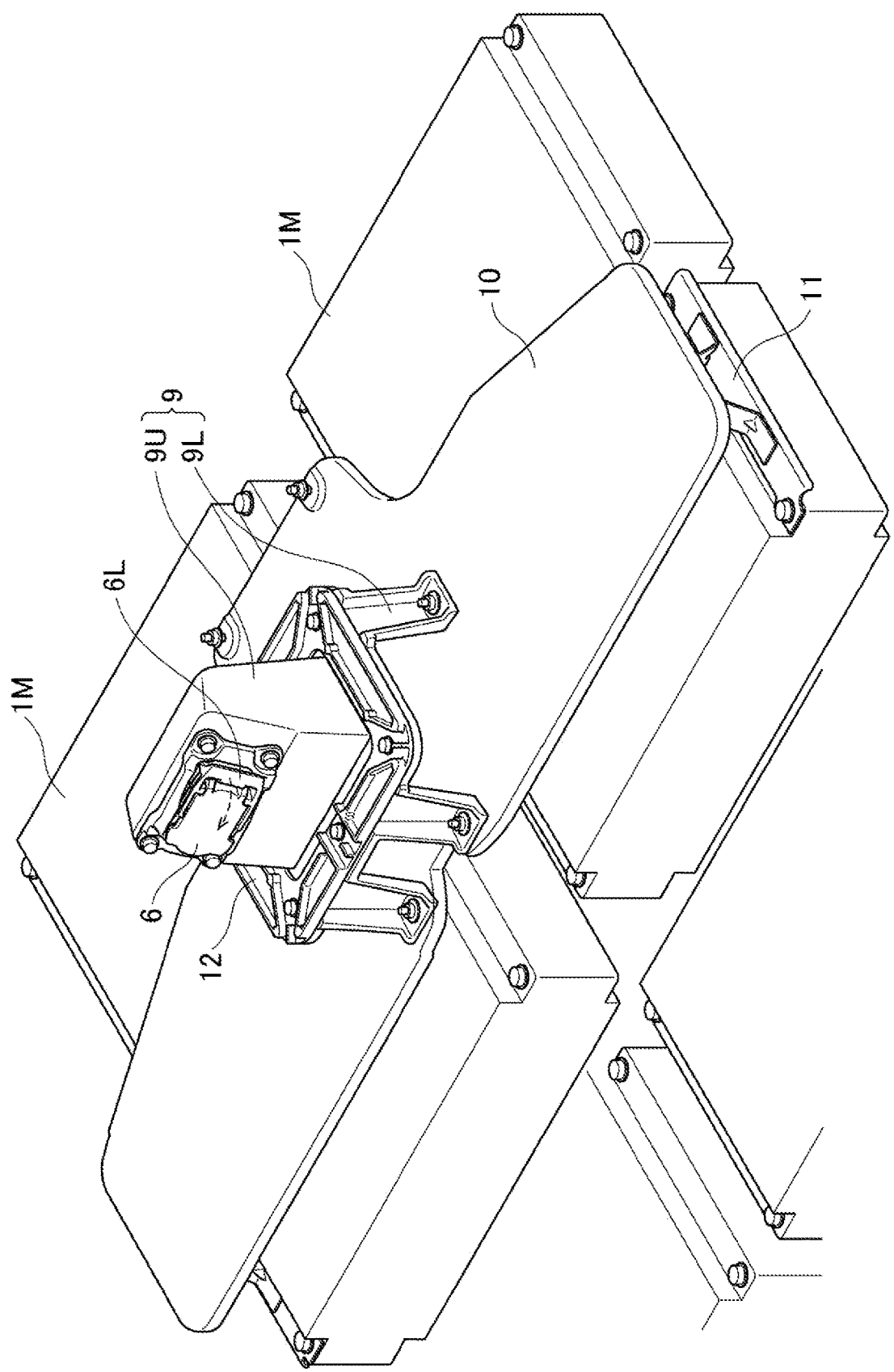
FIG. 4 is an enlarged perspective view of the disconnect plug and a plug bracket in the structure of the disconnect plug.

The plug bracket 9 is made of resin and formed by injection molding. As shown in FIG. 4, the plug bracket 9 is configured of a lower bracket 9L located inside the battery unit 1 and an upper bracket 9U protruding from a top panel 1U of the battery unit 1. Note that FIG. 4 does not show electric harnesses and the detailed internal structure of the disconnect plug 6.

The lower bracket 9L and the upper bracket 9U are joined to each other with the top plate 1U of the battery unit 1. Specifically, the lower bracket 9L is fixed onto a base plate 10 provided above battery modules 1M (or, on an upper face thereof), many of which are installed inside the battery unit 1. The base plate 10 is fixed to the battery modules 1M via brackets 11 (and fixed with a bottom of a case of the battery unit 1). Electronic components and the electric harnesses are also fixed onto an upper face of the base plate 10.

A bottom plate (flange) of the upper bracket 9U is placed on an upper plate of the lower bracket 9L, and this plane contacts the bottom face of the top panel 1U. A portion of the upper bracket 9U other than the flange protrudes upward through a hole formed in the top panel 1U. When the battery unit 1 is attached to the vehicle body (the side sills 2 and so on) from beneath, the upper portion of the upper bracket 9U enters the inside of the bulge 5. A retainer 12 made of resin (or metal) is attached onto the top panel 1U. The retainer 12 is fixed with the upper plate of the lower bracket 9L and the flange of the upper bracket 9U by screws while it sandwiches the top panel 1U.

The disconnect plug 6 has a lever 6L, and its removal is done by operating the lever 6L. The disconnect plug 6 is mounted on the plug bracket 9 so that the lever 6L is swung laterally. That is, the disconnect plug 6 is oriented so that the lever 6L is swung laterally. Further in other words, a swing axis of the lever 6L is substantially vertical. Here, "substantially vertical" means 0° to 30° to the horizontal plane. The lever 6L may incorporate a locking mechanism. A fuse may also be incorporated in the disconnect plug 6.

As shown in FIG. 1, a cover 14 for covering an opening 7 (a lid 8), which is capable of being opened and closed, is provided on a trim 13 beneath a front face of the seat cushion 3. The cover 14 can be vertically opened and closed. In the present embodiment, a top edge of the cover 14 is a hinge and it is opened upward. In addition, the trim 13 is a flexible cloth material, and the closed state is maintained by slide fasteners or Velcro tapes. Since the hinge is located at the top, the cover 14 will close downward due to its own weight even when failing to fasten the slide fasteners or the like. Therefore, the opening 7 (the lid 8) is kept out of sight. Furthermore, the cover 14 is oriented oppositely to a passenger's line of sight. Therefore, the cover 14 provides the interior with a beautiful appearance and hides the access portion to the disconnect plug 6. Note that the trim 13 may be a plastic panel. In this case, the cover 14 may have a plastic hinge and engagement pawls, and its closed state is maintained by the engagement pawls.

A removal operation of the disconnect plug 6 will be described below. The cover 14 is opened and then the lid 8 is removed. For maintenance, the lid 8 is removed by removing screws. For passenger rescue, the lid 8 can be forcibly removed by using a crowbar or the like. Next, a hand is entered through the opening 7 and then the lever 6L is swung laterally by 90°. Subsequently, the disconnect plug 6 is removed by pulling the lever 6L, and then can be taken out through the opening 7. In this manner, the high voltage system can be disconnected.

At the operation, the disconnect plug 6 is easily accessible through the trim 13 exposed in the passenger compartment. Since a leg space for passengers in the rear seats is made in front of the trim 13, the opening 7 is also easily accessible and a sufficient working space can be ensured. It is not needed to remove the seat cushion 3 of the rear seats (the bench seat) in order to access the disconnect plug 6. Since the disconnect plug 6 is located beneath the center of the bench seat in the lateral direction, it can be easily accessed from either the left or right side of the vehicle during maintenance or rescue operation. This arrangement of the disconnect plug 6 is important especially during rescue operation in which it can be accessed only from any one side.

It could also be assumed that a passenger sitting in the rear seat might find the disconnect plug 6 if the lid 8 was left removed for some reason. (However, as described above, the cover 14 closes due to its own weight and the opening 7 is hard to be found.) Even in such a case, the passenger sitting in the rear seat cannot easily operate the lever 6L, because the operating direction of the lever 6L, which is located deeper than the opening 7, is in the lateral direction. A passenger sitting in the rear seat may operate it in a case where the operating direction is a vertical direction (especially, an upward direction), so that the operating direction is set to the lateral direction for anti-tamper in the present embodiment.

Figure 5:
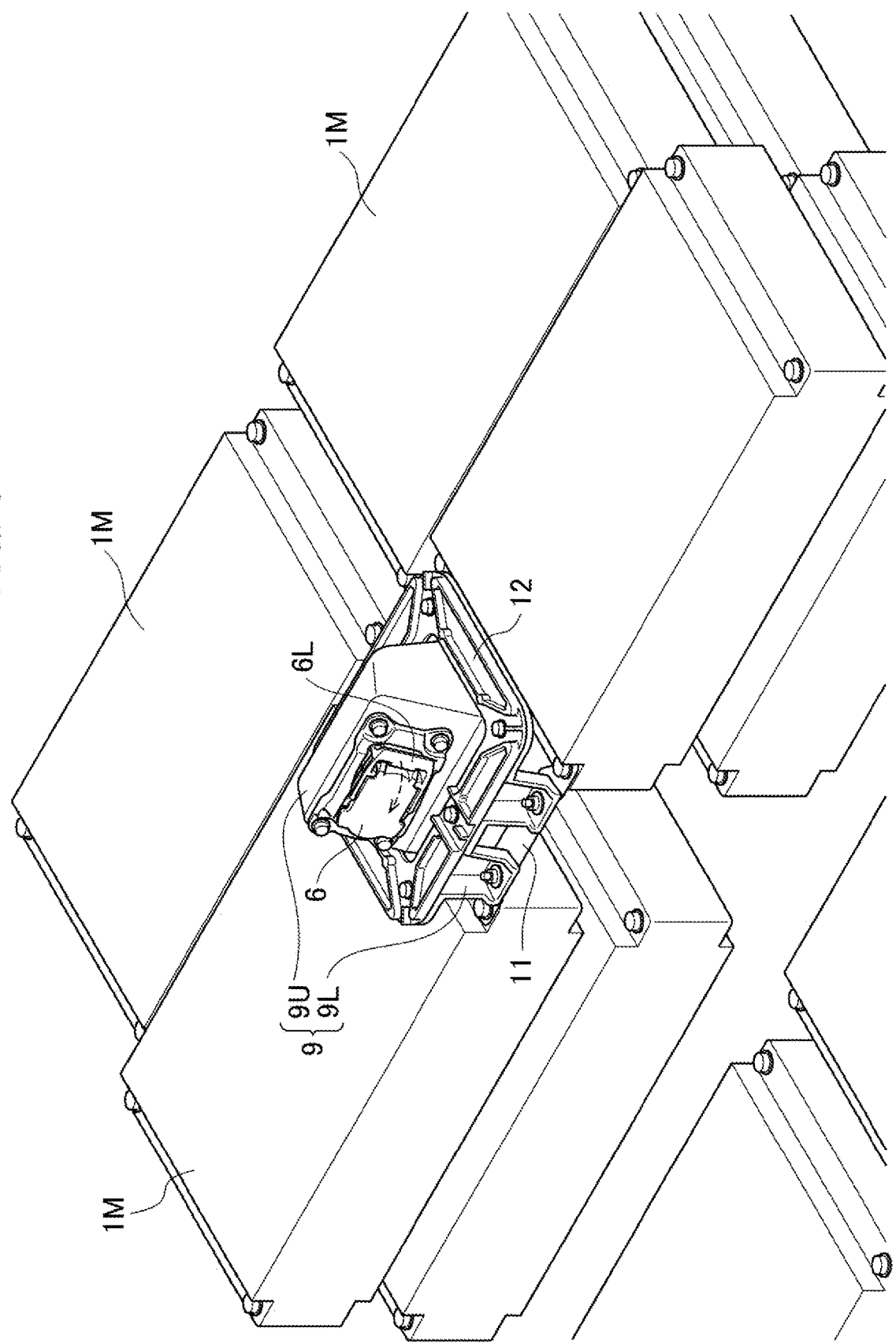
FIG. 5 is an enlarged perspective view of a disconnect plug and a plug bracket in a structure of a disconnect plug according to a modified example.

FIG. 5 shows a modified example of the above embodiment. With respect to a BEV, there may be a case where different grades with different charging capacities (cruising ranges with no charging) are provided. The higher the charging capacity is, i.e., the more battery modules 1M are installed, the higher the vehicle price gets. Therefore, multiple charging capacities (models/grades) are provided in order to meet user requirements. In such a case, it may be possible to increase capacity of the single battery module 1M, but it is also possible to increase the number of the battery modules 1M installed in the battery unit 1. Although an installation space must be found to increase the number of the battery modules 1M and an under-floor space is limited, the space can be easily found beneath the rear seats.

In the present modified example, the internal configuration of the rear portion of the battery unit 1 is changed to increase the number of battery modules 1M. Specifically, the battery modules 1M are stacked. Even in this case, the arrangement of the floor panel 4 and the disconnect plug 6 cannot be changed. With respect to the disconnect plug 6, it is adaptable by changing only the lower bracket 9L from the embodiment shown in FIG. 4. Since the plug bracket 9 can be divided to the lower bracket 9L and the upper bracket 9U, the upper bracket 9U can be used in common.

Note that the base plate 10 is also eliminated in this case. The lower bracket 9L has a lower height and is fixed to the stacked battery modules 1M via a bracket 11. The upper bracket 9U and the retainer 12 do not require any modification (including their installation positions and installation structures).

According to the above embodiment, the bulge 5 protrudes upward from the floor panel 4 positioned between the seat cushion 3 of the rear seats and the battery unit 1. In addition, the plug bracket 9 is raised from the inside of the battery unit 1 to the inside of the bulge 5, and the disconnect plug 6 is attached to the front face of the plug bracket 9. The opening 7 is opened to front on the front wall of the bulge 5, and the cover 14 is provided on the trim 13 beneath the front face of the seat cushion 3. Therefore, the disconnect plug 6 can be easily accessed from the trim 13, which is exposed to the interior of the vehicle, through the cover 14 and the opening 7. Here, it is not required to remove the seat cushion 3 of the rear seats.

In addition, the disconnect plug 6 is attached to the plug bracket 9 so that its lever 6L is swung laterally. Therefore, a passenger sitting in the rear seat cannot easily operate the lever 6L, which is located deeper than the opening 7, and the disconnect plug 6 (the lever 6L) can be prevented from being tampered.

Furthermore, the disconnect plug 6 is located beneath the center of the rear seats (the bench seat). Therefore, the disconnect plug 6 is easily accessible from any one of the left or right sides of the vehicle when removing the disconnect plug 6 for maintenance or passenger rescue, and thereby its workability can be improved. In particular, even when accessing it from only any one side during the rescue, its operation can be conducted reliably.

Here, the bulge 5 extends in the lateral direction in association with the lateral width of the bench seat (the rear seats). That is, the bulge 5 for preventing a submarine motion of a passenger is formed so as to cover all the passengers in the bench seat. Therefore, the bulge 5 functions as a bead formed in the floor panel 4, and thereby the floor panel 4 can effectively resist a lateral load during a side impact and so on and protect the battery unit 1 effectively. Since the bulge 5 extends in the lateral direction, the disconnect plug 6 (and the upper portion of the plug bracket 9) located inside the bulge 5 won't contact the floor panel 4 and thereby won't suffer therefrom even when its relational position to the floor panel 4 is changed by deformation of the vehicle body during the side impact, Furthermore, the plug bracket 9 is configured of the lower bracket 9L and the upper bracket 9U, and the lower bracket 9L and upper bracket 9U are jointed to each other with the top plate 1U of the battery unit 1. Therefore, it is easily adaptable by simply replacing the lower bracket 9L when changing the number of battery modules 1M installed in the battery unit 1.

Note that the present invention is not limited to the embodiment described above. For example, the electric vehicle may not be a battery electric vehicle (BEV), but a hybrid electric vehicle (HEV: including PHEV). In the above embodiment, the plug bracket 9 is configured of the lower bracket 9L and the upper bracket 9U. However, the plug bracket 9 may be injection-molded monolithically. In this case, a first molding die corresponding to the upper bracket 9U and a second molding die corresponding to the lower bracket 9L are used. Here, the plug bracket 9 shown in FIG. 4 and the plug bracket 9 shown in FIG. 5 can be molded only by using two types of the second molding dies. In other words, the first molding die can be used in common.

REFERENCE SIGNS LIST

1 battery unit
1U top panel (of the battery unit 1)
3 seat cushion (of the rear seats)
4 floor panel
5 bulge
6 disconnect plug
6L lever (of the disconnect plug 6)
7 opening
9 plug bracket
9L lower bracket
9U upper bracket
13 trim (beneath the seat cushion 3)
14 cover

The invention claimed is:

1. A structure of a disconnect plug of an electric vehicle, the structure comprising:
    a battery unit installed beneath rear seats in a passenger compartment;
    a bulge protruding from a floor panel positioned between a seat cushion of the rear seats and the battery unit for preventing a submarine motion of a passenger upon a frontal collision;
    a plug bracket raised from an inside of the battery unit to an inside of the bulge;
    a disconnect plug detachably attached to a front face of the plug bracket for disconnecting electric power circuits of the battery unit;
    an opening opened to front on a front wall of the bulge for accessing the disconnect plug; and
    a cover provided on a trim beneath a front face of the seat cushion to be capable of being opened and closed for covering the opening.

2. The structure of the disconnect plug according to claim 1, wherein the disconnect plug includes a lever to be operated when being removed, and is attached to the plug bracket so that the lever is swung laterally.

3. The structure of the disconnect plug according to claim 1, wherein the rear seats are a bench seat, and the disconnect plug is located beneath a center of the bench seat.

4. The structure of the disconnect plug according to claim 3, wherein the bulge extends so as to be associated with a lateral width of the bench seat.

5. The structure of the disconnect plug according to claim 4,
   wherein the plug bracket is configured of a lower bracket in the inside the battery unit and an upper bracket raised from a top plate of the battery unit, and
   wherein the lower bracket and the upper bracket are joined to each other with the top plate.

\* \* \* \* \*